United States Patent [19]

Pizzuti et al.

[11] 4,068,248

[45] Jan. 10, 1978

[54] PHOTOGRAPHIC CAMERA BODY AND TRIPOD MOUNTING ARRANGEMENT

[75] Inventors: Donato F. Pizzuti, Saugus; Charles W. Triggs, Marshfield, both of Mass.

[73] Assignee: Polaroid Corporation, Cambridge, Mass.

[21] Appl. No.: 719,843

[22] Filed: Sept. 2, 1976

[51] Int. Cl.² .................... G03B 17/02; G03B 17/04; G03B 17/00

[52] U.S. Cl. .................................. 354/288; 354/187; 354/293

[58] Field of Search .................. 354/81, 82, 288, 202, 354/292, 293, 187, 194

[56] References Cited

U.S. PATENT DOCUMENTS

| | | |
|---|---|---|
| 2,413,017 | 12/1946 | Willcox .......................... 354/187 X |
| 2,586,954 | 2/1952 | Juliano ............................... 354/81 |
| 2,839,668 | 6/1958 | Mills ............................. 354/293 X |
| 3,126,187 | 3/1964 | Mooney .......................... 354/293 X |

*Primary Examiner*—Donald A. Griffin
*Attorney, Agent, or Firm*—David R. Thornton

[57] ABSTRACT

A camera body and tripod mounting arrangement in which a sill member of plastic material carrying a metal socket insert is directly receivable against the interior bottom wall surface of the body and retained in place by integral tab and lug formations on the member and body, respectively. The sill member is provided with an angled flange extension projecting from the body in a manner to be co-extensive with a pivotal contoured cover. The angled flange construction of the sill member serves to distribute stresses on the socket insert to appropriate load-carrying structure in the body.

12 Claims, 8 Drawing Figures

PHOTOGRAPHIC CAMERA BODY AND TRIPOD MOUNTING ARRANGEMENT

BACKGROUND OF THE INVENTION

This invention relates to photographic apparatus and more particularly, it concerns an improved camera body construction and novel tripod mounting arrangement for use primarily, though not exclusively, in camera bodies molded from synthetic resinous or plastic materials.

The use of molded, synthetic resinous materials in relatively low-cost camera bodies is well known in the photographic art. Such materials can be shaped with the degree of precision required to achieve necessary light-proof seals and possesses adequate rigidity and strength to assure the measure of structural integrity required for optical accuracy. Provision must be made in plastic camera bodies, however, for reinforcement at the points of concentrated stress, such as for example, the connection of the camera body with a tripod mount.

The conventional camera tripod or stand is provided with a threaded bolt or screw receivable by an internally threaded socket in the camera body in a manner such that the body is clamped against the pad on the tripod often with considerable force due to excessive tightening by inexperienced photographers. Although the stresses on the interengaging threads can be accommodated by forming the socket as a metal insert in the otherwise plastic body, distribution of stress to the primary structural portions of the plastic camera body is necessary to avoid failure of the plastic in the region of the metal insert.

The achievement of stress distribution from the region of the tripod mounting socket is a particular problem in plastic bodies of large format collapsible bellows-type cameras where interior body space must be maximized to accommodate such components as a shutter housing, lens, erecting linkage and the like behind a cover when the camera is collapsed for compactness during carrying or storage. Also in collapsible bellows cameras, the need for strength in the region of the tripod mounting socket is accentuated by the forward projection of components from the body when the camera is erected for use. In the erected camera, the center of weight is displaced forwardly of the camera and correspondingly of the tripod mounting socket therein to develop an eccentric load adding to the stress concentration at the socket when the erected camera is supported by a tripod or similar support.

SUMMARY OF THE PRESENT INVENTION

In accordance with the present invention, the problems associated with tripod mounting sockets for camera bodies are substantially reduced by supporting an internally threaded metal socket in a molded plastic component receivable along the lower interior edge of a frame like body in a manner to transmit stresses at the socket throughout the body without compromising the interior space available. The plastic component projects from the body as a surface extension of a closed pivotal cover to provide a flanged cross-sectional shape resistant to bending in multiple planes and is insertable or replaceable as a unit without adhesives of other auxiliary connecting means. A system of latching tabs is provided by which the plastic insert may be easily assembled with the camera body.

Among the objects of the present invention are therefore: the provision of a novel and improved tripod mounting arrangement for photographic cameras; the provision of such a tripod mount particularly suited for use in photographic camera bodies formed primarily of plastic materials; the provision of such a tripod mount for plastic camera bodies by which structural integrity of the camera body incorporating the mount is enhanced without compromising interior body space; the provision of a tripod mounting arrangement for collapsible bellows-type cameras having an erecting linkage and cover assembly closable against the camera body; the provision of such a tripod mount for such collapsible cameras in which various cover-camera body color combinations can be accommodated without complicating camera assembly procedures; and the provision of such a tripod mount by which camera assembly is facilitated while at the same time enhancing the structural integrity of the camera body without need for auxiliary assembly materials and/or components.

Other objects and further scope of applicability of the present invention will become apparent from the detailed description taken in conjunction with the accompanying drawings in which like parts are designated by like reference numerals.

DETAILED DESCRIPTION OF THE PREFERRED EMBODIMENT

Figure 1:
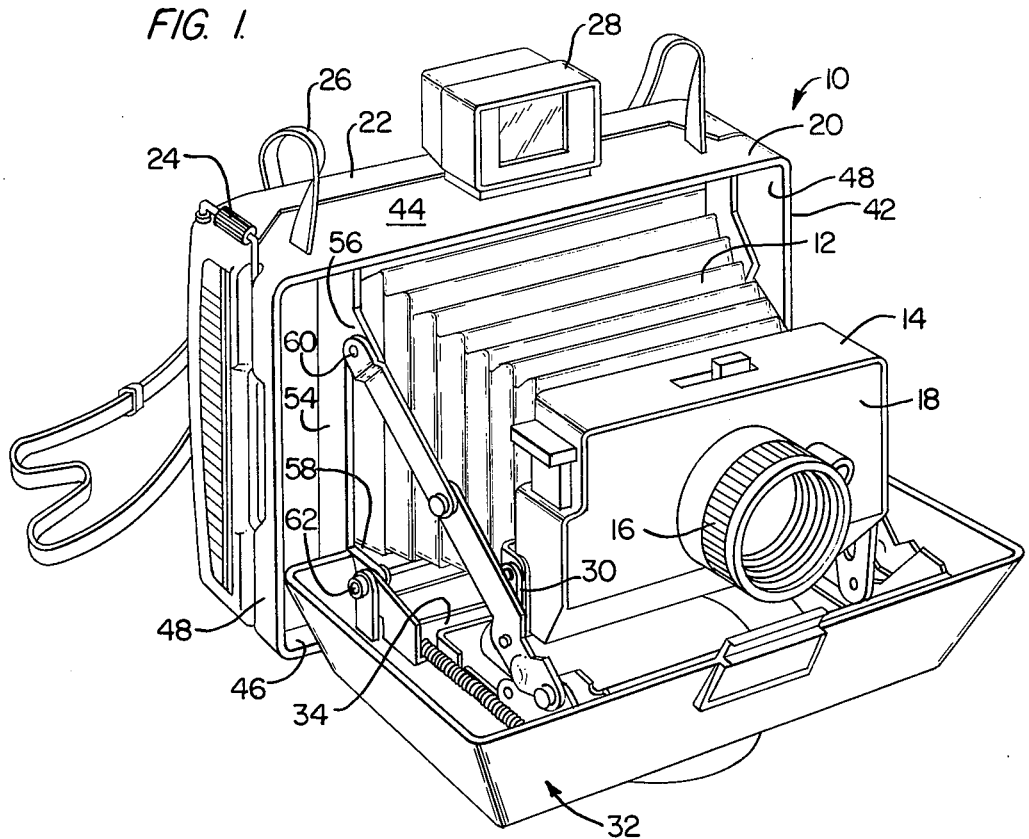
FIG. 1 is a perspective view illustrating a collapsible bellows-type camera incorporating the tripod mount of the present invention and shown in an erected condition.
Figure 2:
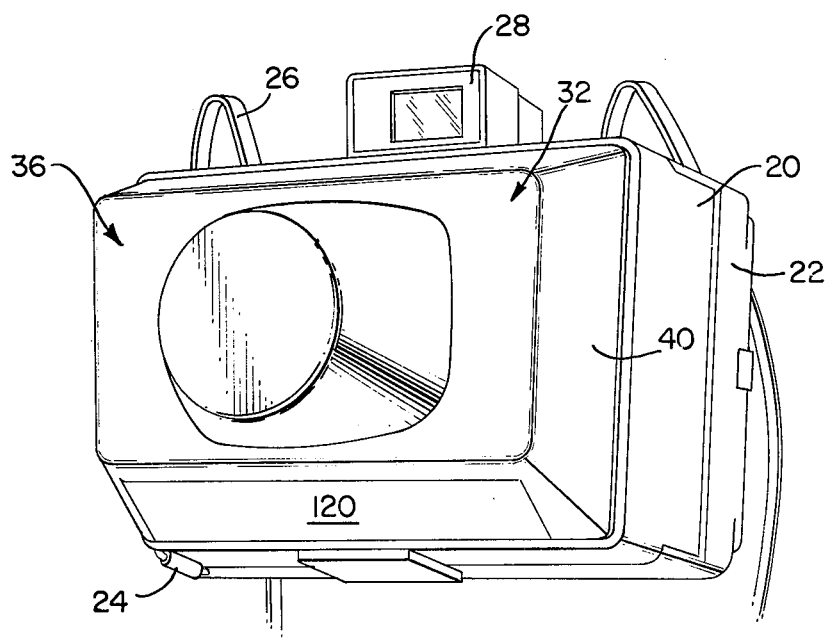
FIG. 2 is a perspective view illustrating the same camera in closed or collapsed condition.

In FIGS. 1 and 2 of the drawings, a large format collapsible bellows camera is shown to include a film housing generally designated by the reference number 10 and connected by a foldable bellows 12 to a shutter housing 14 supporting an objective lens 16 on the front face thereof. The film housing 10 includes a body 20 to which a rear film access door 22 is pivotally connected at one end and secured at the other end by a latch bail 24. A carrying strap 26 and viewfinder 28 are secured to the top of the housing body in conventional fashion as shown.

The shutter housing 14 is supported by an erecting linkage 30 in a manner to enable movement of the shutter housing 14 from the extended position shown in FIG. 1 of the drawings to a collapsed position against the folded bellows 12 and housing body 20. The linkage 30 is also connected to a pivotal front cover assembly 32 including a metallic supporting frame or spider 34 on which a shaped cover plate 36 is supported. Cover plate 36 is of dish-shaped configuration to define a front panel portion 38 integral with a tapered edge portion 40. The cover plate 36 is preferably molded of a suitable plastic material such as an ABS resin (Acrylonitrile-butadiene-styrene) and may be of a color the same as or different than the color of the body 20. As shown in FIG. 2, the cover plate 36 closes over the collapsed shutter housing 14 and lens thereof against a peripheral lip 42 which lies in a plane defining the front face of the body 20.

The housing body 20 may also be an integral molding of plastic material such as an ABS resin and is shaped to define an essentially rectangular frame structure having respective top, bottom and side walls, 44, 46, and 48 of a fore-aft depth sufficient to define with the cover 32 a chamber of sufficient capacity to house the shutter housing 14, lens 16 and related equipment and also to render the body resistant to a flexure. A shown in FIG. 3 of the drawings, a format framing window 50 is defined by a medial web 52 and centered between a pair of linkage mounting flanges 54 extending between and joined integrally with the top and bottom walls 44 and 46. The flanges are formed with upper and lower pivot bracket extensions 56 and 58 to which the erecting linkage 30 and cover frame 34 are pivotally connected by pins 60 and 62. It will be appreciated that the space circumscribed by the flanges 54 and the portion of the top and bottom walls extending between the flanges is necessary both to accommodate the window 50 as well as to provide space for the retracted or collapsed shutter housing 14, bellows 12 and to some extent linkage 30. Also it will be appreciated that the flanges 54 contribute significantly to the strength and rigidity of the body 20.

Figure 3:
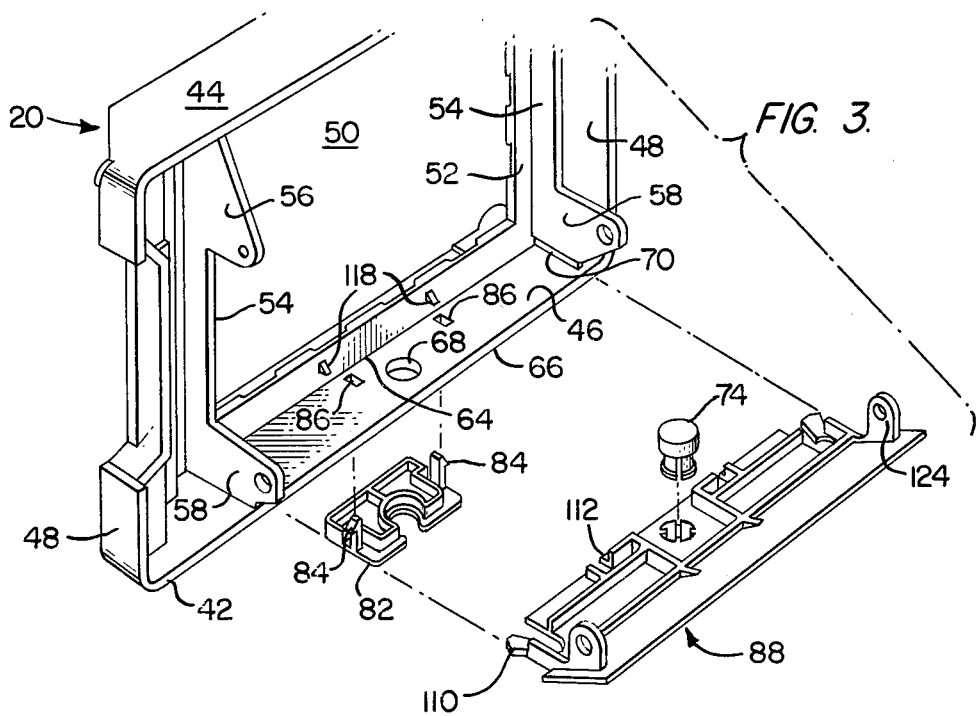
FIG. 3 is a fragmentary exploded perspective view illustrating the components of the camera body tripod mount of the present invention.
Figure 4:
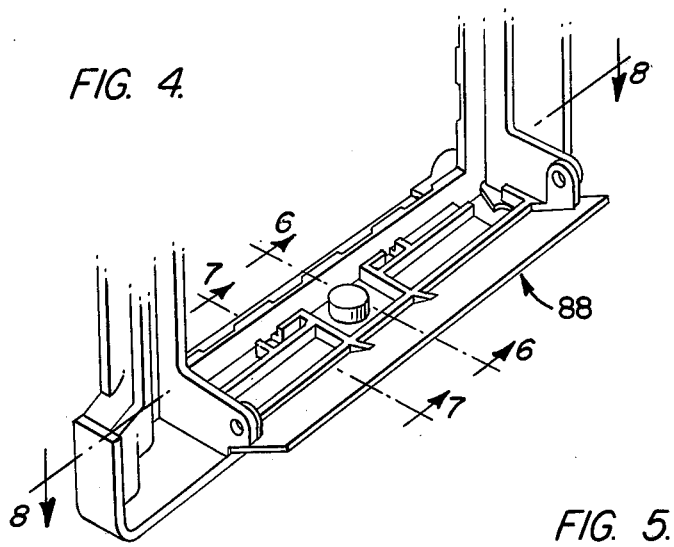
FIG. 4 is a fragmentary perspective view illustrating the assembled camera body and tripod mount of the invention.
Figure 5:
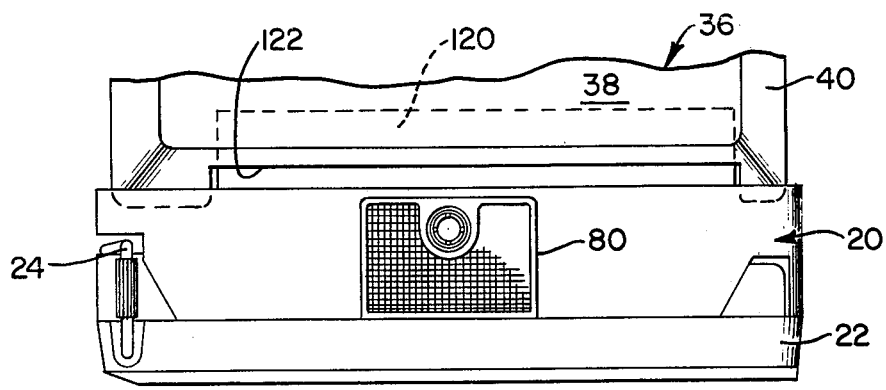
FIG. 5 is a fragmentary bottom plan view of the camera shown in FIGS. 1 and 2 in an open or erect condition.
Figure 7:
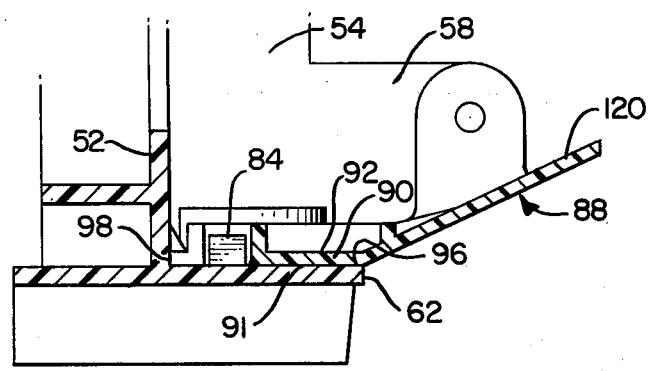
FIG. 7 is a similar cross-section taken on line 7—7 of FIG. 4.

It will be noted by reference to FIGS. 3, 5 and 7 of the drawings, for example, that the portion of the bottom wall 46 extending between the flanges 54 is defined by an inner rectangular planar surface having a rear edge 64 deliniated by the web 52 and a front edge 66 which lies essentially in the plane of the lip 42 on front face of the camera body 20. The outer surface of the wall portion 46 (FIG. 7) joins with the front edge 22 but extends rearwardly throughout the depth of the body. A circular aperture 68 is located rearwardly of the front edge 66 and approximately centered between the flanges 54. Further, grooves 70 are formed at the base of the flanges 54 in a manner such that the lower sides of the grooves are co-planar with and define opposite ends of the inner surface of the wall portion 46. The upper side edges of the grooves 70 define downwardly facing shoulders, the function of which will become apparent from the description below.

Figure 6:
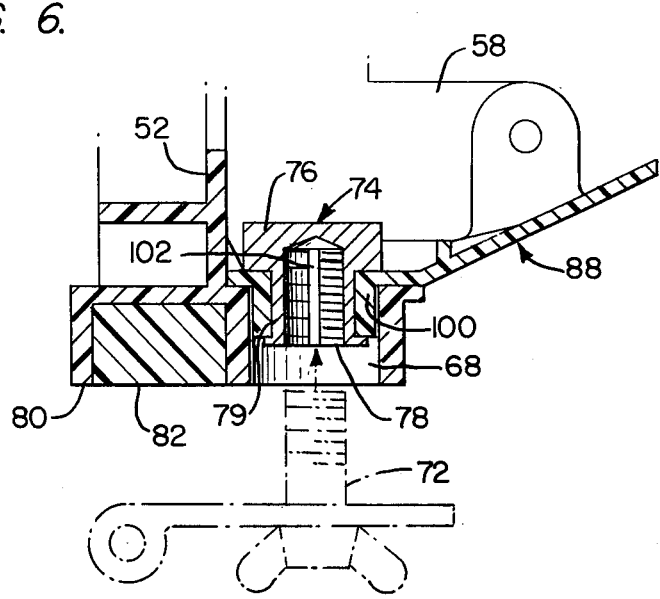
FIG. 6 is an enlarged fragmentary cross-section taken on line 6—6 of FIG. 4.

In accordance with the present invention, the camera incorporating the body 20 is adapted to be supported on a conventional tripod or other camera support and retained thereon by engagement of an externally threaded thumb screw 72 (FIG. 6) on such a tripod in an internally threaded socket 74. The socket is preferably a metal insert having a head or closed end 76 and an open end 78 in a hollow shank portion 79 presented through the aperture 68 in the bottom wall portion 46. Although the supporting arrangement for the socket member 74 will be described in more detail below, it will be noted in FIGS. 3, 5, and 6 that the outer surface of the wall portion 46 is formed with a frame-like projection 80 in the area of the aperture 68 and which defines a well for receiving a tripod mounting pad 82. The pad may be molded of suitable plastic material and is formed with hook-lugs 84 engageable with the inner surface of the wall portion 46 through apertures 86. The frame projection 80 is shaped to define an extension of the aperture 66 from the inner surface of the wall portion 46 and correspondingly, the pad 82 is shaped to complement the interior well defined by the frame portion 80.

In accordance with the invention, the metal socket 74 is supported from the body 20 by a sill member 88 of molded plastic material or resin of a type the same as or different than that from which the body 20 is molded. Although the material used in the sill member 88 may therefore be formed from any of several acceptable moldable materials, it will be seen in FIGS. 3 and 6-8 of the drawings that it is shaped to include a base portion or flange 90 of generally rectangular configuration to establish inner and outer faces 92 and 94 extending between front and rear edges 96 and 98 and of the length between the end edges thereof approximately the length of the wall portion 46 between the flanges 54. The outer face 94 of the base portion 90 complements the shape of the inner face of the wall portion 46, or is essentially planar in the embodiment illustrated, and is provided with a depending annular boss portion 100 to receive the shank portion 79 of the socket member 74. The annular boss 100 is provided with internal ribs to engage in slots 102 extending the length of the socket member shank to facilitate inward flexure of the shank portion of the socket member such that the boss 100 will be received between flange-like formations 104 at the open end 78 of the insert 74 and the head 76 thereof. Also the ribs engaged in the slots 102 prevent rotation of the socket member 74 relative to the boss portion 100.

Figure 8:
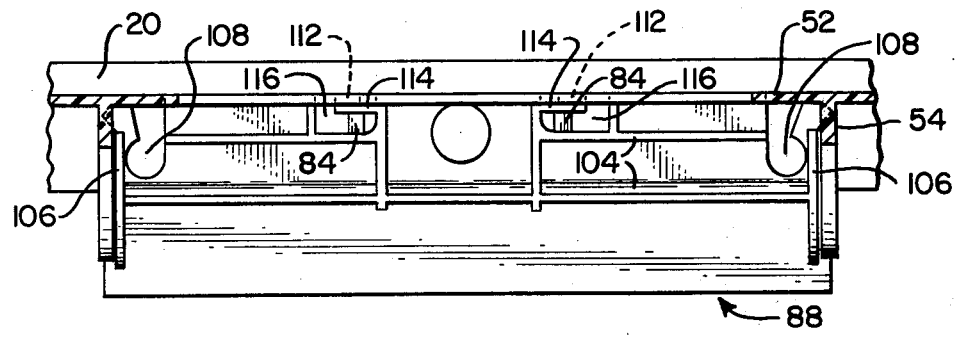
FIG. 8 is an enlarged fragmentary cross-section taken on line 8—8 of FIG. 4.

The inner face 92 of the base 90 is provided with upstanding reinforcing ridges 104 as shown most clearly in FIGS. 3 and 8. The ridges 104 join in end ribs 106 adjacent cut outs 108 to define end tabs 108 capable of flexure in the plane of the base portion 90 but resistant to flexure out of that plane as a result of the end ribs 106. The end tabs 108 engage in the groove 70 at the base of the flanges 54 and the body 20 to retain the base of the plate-like member 88 against the wall 46.

Additional tabs 112 are located along the rear edge 98 of the base portion 90 intermediate the length thereof and are defined by extensions 114 of the reinforcing ribs 104 adjacent openings 116 which overlie the apertures 86 to accommodate the lugs 84 of the pad 82 in the assembled camera. The tabs 112 are therefore capable of flexure also in the plane of the base 90 but resistant to flexure out of that plane. These tabs 112 are adapted to be engaged by tapered lugs 118 projecting from the web 52 and, like the grooves 70, define downwardly facing shoulders.

The sill member 88 is further provided with an integral flange 120 projecting upwardly and forwardly from the front edge 96 of the base portion 90. Because of the angular disposition of the flange 120 relative to the base portion 90, it will be appreciated that the member 88 is resistant bending along the length thereof. Moreover, the angular disposition of the flange 120 is selected to conform with the angle of the tapered edge portion 40 of the cover to provide a flush or continuous exterior surface conformation with the cover plate 36. Also in this respect and as shown in FIGS. 2 and 5, for example, the flange 120 lies within a cut-out 122 in the cover plate 36 to facilitate pivotal movement of the cover about the axis of the pins 62 which are elevated above the bottom wall 46. The flange 120 thus insures a reasonably dust-proof seal between the cover and the lip 42 of the housing 20 along the bottom of the camera. The connection of the sill member 88 to the camera body is augmented further by a pair apertured flange portions 124 near the ends of the flange portion 120 to be engaged by pins 62 which support the cover assembly 32 pivotally from the body 20.

The socket 42 and sill member 80 may be assembled with the body 20 very simply by sliding the member 88 inwardly and downwardly against the inner surface of the wall portion 46 so that the boss portion 100 extends through the aperture 68. Once the boss is located in the aperture 68, a simple downward pressure will cause the tabs 112 to flex inwardly under the tapered lugs 118 and the tabs 110 to drop into the grooves 70. Thus assembled, the front edge 96 of the base portion 90 of the number 88 will overlie the front edge 62 of the bottom wall portion 46. The apertured flange portions 124 will also then be appropriately located such that when the cover is assembled with the camera by the pins 62, the assembly of the member 88 with the body will have been completed. Because of the inherent resistance of the member 88 to bending along its length, clamping stresses on the socket insert 74 will be transmitted completely along the length of the bottom wall portion 46 to the flanges 54 in a manner to fully integrate the structure of the socket 74 with the camera body 20.

Thus it will be seen that by this invention there is provided an improved tripod mounting arrangement for photographic cameras by which the above-mentioned objectives are completely fulfilled. Also it will be apparent to those skilled in the art from the preceding description that various modifications and/or changes may be made in the disclosed embodiment without departure from the inventive concept manifested thereby. Accordingly, it is expressly intended that the foregoing description is illustrative of a preferred embodiment only, not limiting, and that the true spirit and scope of the present invention be determined by reference to the appended claims.

We claim:
1. A photographic camera comprising:
   a body having a bottom wall portion extending between a pair of spaced flange formations joining with said bottom wall portion, said bottom wall portion having inner and outer surfaces joined at a front edge in a plane defining the front face of the body and having an aperture therein spaced rearwardly from said front edge; and
   means for mounting said body on a support, said means comprising a socket member having an open end and a sill member having a base portion of generally rectangular configuration to establish inner and outer faces extending between front, rear and opposite end edges, an annular boss projecting from said outer face to receive said socket member with said open end thereof presented in the direction of said outer face, said outer face complementing the inner surface of said bottom wall between said flange formations and receivable against the inner surface of said bottom wall with said boss in said wall aperture and with the outer edge of said base portion essentially overlying the outer edge of said bottom wall, and an integral flange extending from the front edge of said base portion at an angle to said inner and outer faces thereby to reinforce said base portion against bending along the length thereof between said opposite ends.

2. The apparatus recited in claim 1 wherein said socket member is a metallic insert having a head portion and internally threaded hollow shank and wherein said sill member is molded from synthetic resinous material.

3. The apparatus recited in claim 2 wherein said hollow shank portion is formed with axial slots to receive internal ribs in said boss portion and includes outwardly projecting flange formations engageable with the projecting end of said boss portion.

4. The apparatus recited in claim 1 including a cover pivotally connected to said body and movable between open and closed positions on an axis spaced above and parallel to the front edge of said bottom wall portion.

5. The apparatus recited in claim 4 wherein said cover is of dish-shaped confinguration to establish a front panel and rearwardly tapered peripheral edge portions, the peripheral edge portion along the bottom of said cover being cut out to receive said integral flange on said sill member.

6. The apparatus recited in claim 5 wherein the angle at which said integral flange projects corresponds to the taper of the peripheral edge portions of said cover so that said integral flange is flush with the exterior surface of said cover in the closed position thereof.

7. The apparatus recited in claim 1 wherein said base portion includes integral tabs receivable under downwardly facing shoulders in said body spaced from the inner surface of said bottom wall portion, said tabs being laterally flexible and resistant to vertical flexure.

8. The apparatus recited in claim 7 wherein said tabs are defined in part by integral ribs upstanding from the inner face of said base portion and adjacent to openings formed therein.

9. The apparatus recited in claim 1 including a depending frame-like formation on the outer surface of said bottom wall portion to define a mounting pad well about said aperture, and a mounting pad receivable in said well.

10. The apparatus recited in claim 9 wherein said mounting pad is molded of synthetic resinous material and formed with hook-lugs engageable in openings in said bottom wall portion.

11. The apparatus recited in claim 10 wherein said base portion is formed with cut-outs or openings to accommodate said hook-lugs.

12. The apparatus recited in claim 11 wherein said cut-outs or openings are adjacent to ribs defining support for laterally flexible, vertically rigid tabs retaining said sill member in said body.

* * * * *